Figure 1:
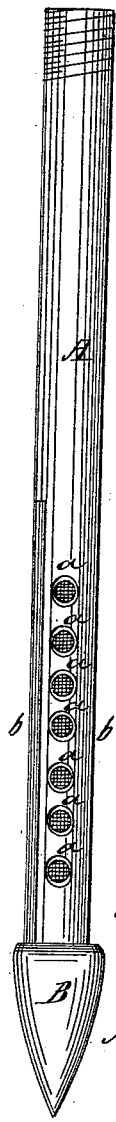

A. Harrington,
Well Tubing,

Nº 61,536.      Patented Jan. 29, 1867.

Witnesses
John P. Jacobs
Charles Alexander

Inventor
Augustus Harrington
per
Alexander & Mason
Attys

United States Patent Office.

AUGUSTUS HARRINGTON, OF WARSAW, NEW YORK.

Letters Patent No. 61,536, dated January 29, 1867.

IMPROVED PIPE FOR WELLS.

The Schedule referred to in these Letters Patent and making part of the same.

TO ALL WHOM IT MAY CONCERN:

Be it known that I, AUGUSTUS HARRINGTON, of Warsaw, in the county of Wyoming, and State of New York, have invented certain new and useful improvements in "Pipes for Wells;" and do hereby declare that the following is a full, clear, and exact description of the same, reference being had to the accompanying drawings, and the letters of reference marked thereon, making a part of this specification.

In the annexed drawings, A represents a metallic tube having a series of circular openings made near the bottom. These openings, $a$, are cut on four sides of the tube, and one above the other. $b\ b$ represent metallic ribs which are perpendicularly attached to the tube A, and extend a slight distance above the height of the row of openings $a$. At the bottom of the tube is a metal spear B, which spear is so constructed that the top portion is larger in diameter than the diameter of the tube A, so as to clear an opening in the ground and prevent the binding of the perforated pipe. Directly under each of the perforations $a$, is placed a screen or filter, $x$, to prevent dirt or sand from being drawn into the tube. This pipe is intended for use in reservoir wells, and is driven in the ground, revolving as it goes down. The ribs $b$ act as reamers to clear the mud or sand from the perforations, one ring being placed between each row of openings $a$. Whenever the sand or anything obstructs the passage of water, the tube is revolved and causes the enlargement of the capacity.

Having thus fully described my invention, what I claim as new, and desire to secure by Letters Patent, is—

The tube A, having a series of four or more perforations $a$; said perforations being lined with wire screens $x$, in combination with the ribs $b$ and spear B, when arranged in the manner substantially as and for the purposes specified.

In witness that I claim the foregoing I have hereunto set my hand in presence of witnesses.

AUGUSTUS HARRINGTON.

Witnesses:
T. J. BURR,
O. L. BURR.